United States Patent [19]

Doerner

[11] 3,935,631
[45] Feb. 3, 1976

[54] METHOD OF SEATING A BEARING
[76] Inventor: Frank Doerner, 138 Aberdeen Road, Kitchener, Ontario, Canada
[22] Filed: Mar. 19, 1975
[21] Appl. No.: 559,912

[52] U.S. Cl. ............... 29/432.1; 29/525; 264/138; 264/249; 308/237 R; 308/DIG. 7
[51] Int. Cl.² ......................................... B23P 11/00
[58] Field of Search ............ 29/432, 432.1, 149.5 R, 29/149.5 NM, 525; 308/237, DIG. 7; 264/138, 248, 249

[56] References Cited
UNITED STATES PATENTS

| | | | |
|---|---|---|---|
| 1,157,666 | 10/1915 | Bennett | 29/432 X |
| 1,776,615 | 9/1930 | Boothman et al. | 29/525 X |
| 2,636,254 | 4/1953 | Gunning | 29/432 X |
| 2,708,246 | 5/1955 | Dunn | 29/525 X |
| 3,074,292 | 1/1963 | Polmon | 74/553 |

*Primary Examiner*—Victor A. Di Palma
*Attorney, Agent, or Firm*—George H. Riches

[57] ABSTRACT

This invention discloses a novel and improved method of seating a bearing, especially for use in chair controls for tiltable chairs. A multi-pointed star-shaped hole is cut in the support and a bearing, preferably made of nylon, which has a series of circular rings on its periphery, each ring diminishing in diameter, is placed in the hole as far as it will go. The bearing is then fused into the hole and the hole cuts the bearing so that shavings are forced into the undercut part of the next largest ring. This provides a secure and tight fitting bearing and removes any necessity for bearings to be made of exact tolerances. The process may also be subject to a fully automated process at a greatly reduced cost.

3 Claims, 4 Drawing Figures

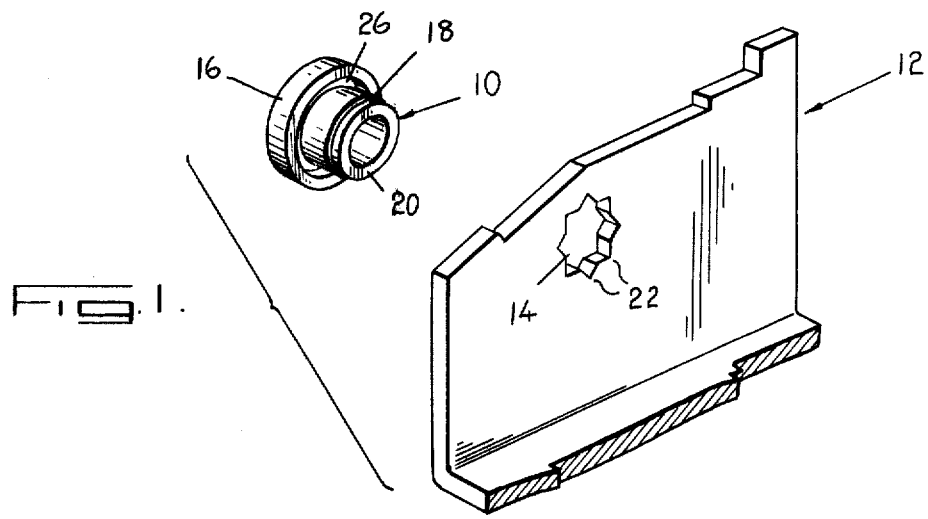
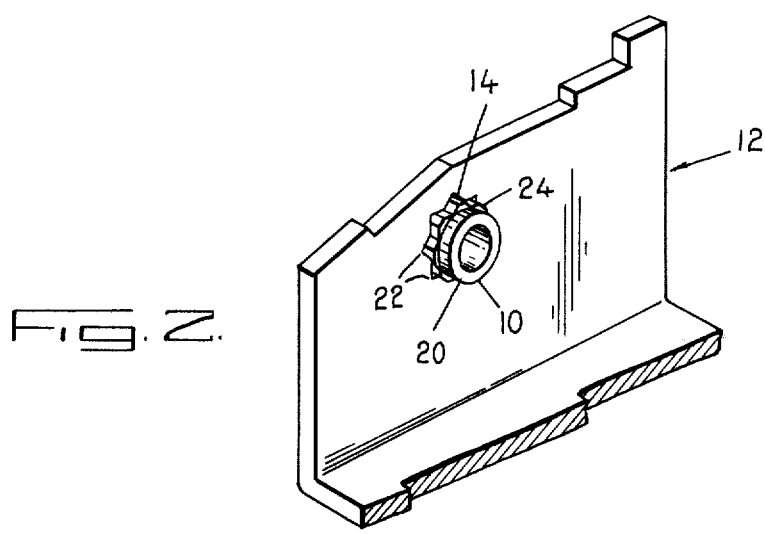
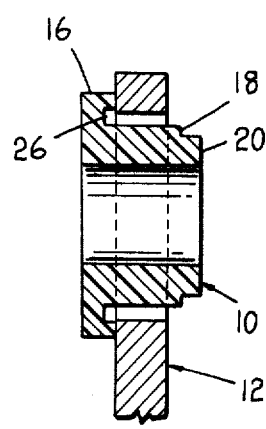 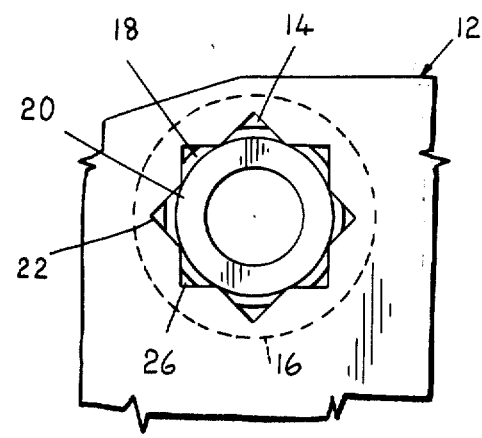

METHOD OF SEATING A BEARING

BACKGROUND OF THE INVENTION

This invention relates generally to a bearing and a method of seating a bearing and more particularly, to a method of seating nylon bearings for use in chair controls for tilter chairs.

In the past, bearings have been produced of different materials and are used to support, guide and restrain moving elements an generally denote that part of a substance which transmits the loads to the supports. A large variety of metals may be used as bearing metals including babbitt (a tin-base alloy containing antimony and copper), white metal bearing alloys, high tin bronze, leader copper, cadmium base alloys, cast iron, silver and various jewels.

An example of the use of a conventional bearing may be seen in the chair control for tilter chairs of the prior art. A typical control of the prior art comprises, inter alia, a movable frame portion attached to the seat of the chair and a fixed frame portion attached to a chair post and a biasing means yieldably interconnecting the two frames. One example of the biasing means comprises a bolt inserted through the fixed frame portion, a spring mechanism affixed to the free end of the bolt with a pressure plate engaging the spring and the fixed frame portion. Two bearings are fastened on opposite sides of the pressure plate and engage corresponding slots in the fixed frame portion or the bearings may be fastened on the sides of the frame portion and correspond to slots in the pressure plate.

The method of seating of bearings of the prior art may vary according to the use for which the bearing is designed and also the particular material from which it is manufactured. However, all the known methods involve manual insertion, manual welding or similar methods.

The thrust bearings used in chair controls of the prior art as hereinbefore described have been seated by inserting a pin through the support and placing a bearing on the pin. This involves the manufacture of a pin, a bearing and the steps of inserting the pin through the support and then inserting the bearing on the pin. The assembly of these pieces had to be exact and the tolerances perfect in order that once seated, neither the pin nor the bearing would rotate. This has proved to be a rather expensive and time consuming process.

SUMMARY OF THE INVENTION

Accordingly, it is an object of the present invention to at least partially overcome these disadvantages by providing a novel method of seating a bearing.

To this end, in one of its aspects, the invention provides a process for seating a bearing comprising cutting a multi-pointed star-shaped hole in the support, providing a nylon bearing which has on its periphery, a series of circular rings, the diameter of the bearing across the first ring being greater than the diameter of the hole in which the bearing is to be seated and the depth of the portion of the bearing carrying the first ring being at least equal to the depth of the hole, and a portion of the bearing carrying at least a second ring of smaller diameter than the first, and inserting the bearing into the star-shaped hole.

BRIEF DESCRIPTION OF THE DRAWINGS

Further objects and advantages of the invention will appear from the following description taken together with the accompanying drawings in which:

FIG. 1 is a view of a bearing and a support with a star-shaped hole cut therein;

FIG. 2 is a plan view showing the bearing seated in the wall;

FIG. 3 is a cross-sectional view showing the bearing seated in the wall; and

FIG. 4 is a side view of the bearing seated in the support.

DETAILED DESCRIPTION OF THE DRAWINGS

Reference is made to FIG. 1 which shows a bearing generally indicated as 10 and a support 12 with a star-shaped hole 14 cut therein.

The bearing 10 carries a series of rings of diminishing diameters. The bearing as shown in FIG. 1 carries a first ring 16, second ring 18 and third ring 20, the largest ring having an undercut 26 at the juncture point with the bearing and the adjacent smaller ring.

The star-shaped hole 14 cut in the support may contain a varied number of points 22 and a preferred example as shown in FIG. 1 has eight points.

The bearing 10 is inserted through the hole 14 in the support from the side opposite to which the bearing will eventually extend. The portion of the bearing carrying the smallest ring 20 is inserted through the hole and then when the diameter of the bearing becomes greater than the diameter of the star-shaped hole, the portion of the bearing carrying the adjacent larger ring is then forced through the hole 14. This causes the points 22 to shave or cut the ring of the bearing in a shape corresponding to the star-shaped hole. As shown in FIG. 2, the ring 24 emerges cut in a shape corresponding to the hole through which it was forced.

The shavings or cuttings from the cut ring automatically fill the undercut part 26 of the largest ring 16 as shown in FIG. 3. Thus, as seen in FIG. 4, when the bearing is seated in the support, a secure and tight fitting bearing is produced.

There are numerous advantages when the method of the present invention is utilized. In the past, when bearings were seated in supports directly, the bearing had to be exactly tooled to prevent slippage in the support. The procedure was a manual one which increased the production costs and time consumed. The present invention reduces the cost and time attributed to seating a bearing and may be made the subject of an automated procedure. The bearings utilized in the present invention may be manufactured of a material which can be shaved or cut by the star-shaped hole. The bearing of the preferred embodiment is made of nylon.

The bearing of the present invention need not be manufactured to exact tolerances since its fitting is accomplished by a cutting or shaving of some of the material, preferably nylon, to produce a perfect fit. Thus, the cost of production of the bearings may be reduced.

The process may also be automated. A bearing is placed adjacent the hole and a means is provided for inserting the bearing in the hole by percussion. The undercut traps the shaved material and guarantees a tight and exact fit.

Although the disclosure describes and illustrates a preferred embodiment of the invention, it is to be understood that the invention is not restricted to this particular embodiment.

What I claim is:

1. A method of seating a bearing in a support, said support containing therein a star-shaped hole, said bearing carrying on its periphery at least three rings of diminishing diameter, the diameter of the largest ring being greater than the diameter of said hole, the diameter of the second ring being marginally larger than the diameter of said hole, the diameter of the subsequent rings being smaller than the diameter of the hole, the largest ring being undercut marginally at the point of juncture with the bearing and the adjacent ring, comprising:

inserting the bearing into the hole commencing with its smallest ring until the diameter of the bearing containing the next ring to be inserted is the portion of the bearing carrying the ring having a marginally larger diameter than the diameter of the hole, forcing said portion of the bearing having a marginally larger diameter than said hole through said hole whereby said ring having a marginally larger diameter than the diameter of the hole is cut by said star-shaped hole in a corresponding star-shaped pattern and the shavings are collected in said undercut portion of said largest ring, whereby said bearing is seated securely in said hole.

2. A method of seating a bearing as claimed in claim 1 wherein said star-shaped hole is an eight-pointed star-shaped hole.

3. A method as claimed in claim 1 wherein said bearing is nylon.

* * * * *